United States Patent
Han et al.

(10) Patent No.: US 8,400,280 B2
(45) Date of Patent: Mar. 19, 2013

(54) DISPLAY TAG, DISPLAY TAG SYSTEM HAVING DISPLAY TAG, AND METHOD FOR WRITING DISPLAY TAG INFORMATION

(75) Inventors: Kuk-hyun Han, Suwon-si (KR); Jae-uk Han, Osan-si (KR); Myoung-soon Choi, Yongin-si (KR); Ju-il Eom, Suwon-si (KR); Sang-jun Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 12/330,878

(22) Filed: Dec. 9, 2008

(65) Prior Publication Data

US 2009/0295549 A1    Dec. 3, 2009

(30) Foreign Application Priority Data

May 27, 2008    (KR) .................. 10-2008-0049236

(51) Int. Cl.
*H04Q 5/22*    (2006.01)
*H04Q 9/00*    (2006.01)
*G08B 21/00*    (2006.01)
*G05B 19/00*    (2006.01)
*G06F 17/00*    (2006.01)
*G06K 17/00*    (2006.01)

(52) U.S. Cl. ................. 340/10.6; 340/686.1; 340/10.51; 340/10.52; 235/375; 235/383

(58) Field of Classification Search ................ None
See application file for complete search history.

(56) References Cited

U.S. PATENT DOCUMENTS

| | | | |
|---|---|---|---|
| 6,924,781 B1* | 8/2005 | Gelbman | 345/85 |
| 7,086,588 B2* | 8/2006 | Hoshina | 235/380 |
| 7,129,938 B2* | 10/2006 | Naugler, Jr. | 345/207 |
| 7,131,584 B2* | 11/2006 | Stephenson et al. | 235/383 |
| 7,163,151 B2* | 1/2007 | Kiiskinen | 235/472.01 |
| 7,180,627 B2* | 2/2007 | Moylan et al. | 358/1.6 |
| 7,229,021 B2* | 6/2007 | Vesikivi et al. | 235/462.01 |
| 7,280,851 B2* | 10/2007 | Oba et al. | 455/566 |
| 7,403,797 B2* | 7/2008 | Silverbrook et al. | 455/557 |
| 7,604,160 B2* | 10/2009 | Imine et al. | 235/375 |
| 7,769,345 B2* | 8/2010 | Johnson et al. | 455/41.1 |
| 7,812,981 B2* | 10/2010 | Minami et al. | 358/1.15 |
| 7,886,972 B2* | 2/2011 | Skaaksrud et al. | 235/384 |
| 7,916,175 B2* | 3/2011 | Yamakita | 348/207.99 |
| 8,130,083 B2* | 3/2012 | Dorney | 340/10.52 |
| 2002/0176113 A1* | 11/2002 | Edgar | 358/3.27 |
| 2006/0098899 A1* | 5/2006 | King et al. | 382/305 |
| 2006/0187316 A1* | 8/2006 | Teramoto et al. | 348/231.3 |
| 2007/0013502 A1* | 1/2007 | Park et al. | 340/447 |
| 2007/0103272 A1* | 5/2007 | Alden | 340/10.2 |
| 2008/0303682 A1* | 12/2008 | Han | 340/686.1 |

FOREIGN PATENT DOCUMENTS

KR    1020010006991 A    1/2001
KR    100746242 B1    7/2007

* cited by examiner

*Primary Examiner* — George Bugg
*Assistant Examiner* — Renee Dorsey
(74) *Attorney, Agent, or Firm* — Sughrue Mion, PLLC (57) ABSTRACT

A display tag is provided. A display tag includes a sensing unit which captures an image displayed on a screen of an external tag writer, if a sensing unit is disposed opposite the screen; and a display unit which displays a captured image. Therefore, a user can visually recognize content related to tag information, and thus user convenience is enhanced.

20 Claims, 5 Drawing Sheets

DISPLAY TAG, DISPLAY TAG SYSTEM
HAVING DISPLAY TAG, AND METHOD FOR
WRITING DISPLAY TAG INFORMATION

CROSS-REFERENCE TO RELATED
APPLICATIONS

This application claims benefit from Korean Patent Application No. 10-2008-0049236, filed on May 27, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a display tag, a display tag system having the display tag, and a method for writing display tag information, and more particularly, to a display tag which captures a display image from an external source and displays the image, a display tag system having the display tag, and a method for writing display tag information.

2. Description of the Related Art

With the development of communication technology, technology using radio frequencies for tracing the location of products, managing stocks, identifying users, or obtaining content has become widespread. A radio frequency system employing the radio frequency technology may include components such as a tag, a tag reader, or a tag writer.

A tag of such a radio frequency system may be classified as either a passive tag, which receives energy from an electromagnetic wave signal of a tag reader or tag writer without requiring inner power, or an active tag, which generates power by itself. The tag may also be classified as either a chip tag, which uses a silicon semiconductor chip, or a chipless tag, which employs an LC element, or a plastic or polymer element.

A related art radio frequency system transmits or receives tag information between a tag and a tag reader or tag writer using electromagnetic waves such as radio frequencies (RF). Accordingly, it is difficult to check tag information recorded in a tag without using a tag reader having a display.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a display tag which captures a display image from external, and displays the captured image, a display tag system having the display tag, and a method for writing tag information.

According to an exemplary aspect of the present invention, there is provided a display tag, including a sensing unit which captures an image displayed on a screen of an external tag writer, if the sensing unit is disposed opposite the screen; and a display unit which displays the captured image.

The display tag may include electronic paper (E-paper).

The display may further include a switching unit which controls the on-off operation of the sensing unit.

The display tag may further include a power generator which generates power using at least one of heat, vibration, rays emitted from the external tag writer, and electromagnetic waves, and operates the sensing unit and the display unit.

The display tag may further include a tag information storage unit which stores tag information acquired from the external tag writer.

The sensing unit may include a plurality of sensors which comprises a sensing area which corresponds to the size of the display unit, and receives rays of an image displayed on a screen of an external display apparatus and output a signal corresponding to the intensity of the rays.

The display tag may further include a driving circuit unit which controls each pixel of the display unit to be driven according to a signal output from the plurality of sensors, wherein the sensing unit, the driving circuit unit, and the display unit are disposed in successive layers.

According to an exemplary aspect of the present invention, there is provided a display tag system including a tag writer which displays an image corresponding to tag information to be provided; and a display tag which captures an image displayed on a tag writing area, if a screen of the tag writer is disposed opposite the tag writing area.

If the display tag is disposed opposite the tag writing area while an image is displayed on the tag writing area, the tag writer may write tag information corresponding to the image on the display tag.

According to an exemplary aspect of the present invention, there is provided a display apparatus, including a display unit; and a sensing unit which captures an image displayed on a screen of an external display apparatus, and provides the display unit with the captured image, if the sensing unit is disposed opposite the screen.

The display unit may include electronic paper (E-paper) which displays an image corresponding to the captured image, and maintains the same display condition even if the power is turned off.

According to an exemplary aspect of the present invention, there is provided a method for writing tag information of a display tag system, the method including displaying at least one image corresponding to tag information which is capable of being provided by a tag writer; if one of the at least one image is selected, displaying the selected image on a tag writing area on a screen of the tag writer; and if a display tag having a display unit is disposed opposite the tag writing area, by the display tag, capturing an image displayed on the tag writing area, and displaying the captured image on the display unit, and by the tag writer, writing tag information corresponding to the selected image on the display tag.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
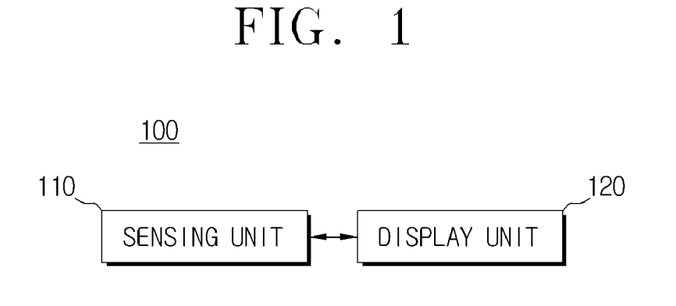
FIG. 1 is a block diagram illustrating a display tag according to an exemplary embodiment of the present invention.

FIG. 1 is a block diagram illustrating a display tag according to an exemplary embodiment of the present invention. Referring to FIG. 1, a display tag 100 according to an exemplary embodiment of the present invention may include a sensing unit 110 and a display unit 120.

When the sensing unit 110 is disposed opposite a screen of an external tag writer, the sensing unit 110 captures an image displayed on the opposite screen. The display unit 120 displays the captured image.

An external tag writer (not shown) includes a display screen, and displays an image on the display screen. The external tag writer, can be, for example, a television (TV), a display apparatus such as a monitor of a computer, or a separately fabricated display apparatus.

If the display tag 100 is disposed opposite a tag writing area of the external tag writer on which an image is displayed, the sensing unit 110 of the display tag 100 captures an image displayed on the tag writing area opposite the sensing unit 110, and displays the captured image on the display unit 120 of the display tag 100.

The tag writing area of the external tag writer (not shown) may be disposed opposite the sensing unit 110 of the display tag 100. As the display tag 100 is thin, the tag writing area of the external tag writer (not shown) may be disposed opposite the display unit 120 of the display tag 100.

The sensing unit 110 includes a sensing area which corresponds to the size of the display unit 120, and a plurality of sensors which receive rays of an image displayed on a screen of an external display apparatus (not shown) and output a signal corresponding to the intensity of the rays.

The display unit 120 may be composed of an electronic paper (E-paper). If the display unit 120 is composed of E-paper, the display unit 120 may display a currently captured image without requiring additional power.

The display tag 100 may be disposed to contact an area of the external tag writer (not shown) on which an image is displayed, or may be disposed apart from the area at a predetermined interval.

The image described here is merely exemplary, and if a user desires to view a movie through the external tag writer (not shown), or a TV or computer connected to the external tag writer (not shown), the image may be a movie poster for conveying movie information, and if a user desires to listen to music through an audio device, the image may be a music album cover. The image may also be an apartment logo to be displayed on a display tag of an apartment entry card.

The display image is captured through the sensing unit 110 of the display tag 100, so the speed of communication is enhanced when displaying an image using tag information received through a communication channel such as an RF. A user can view the information contained in the tag through the display unit 120 of the display tag 100.

Figure 2:
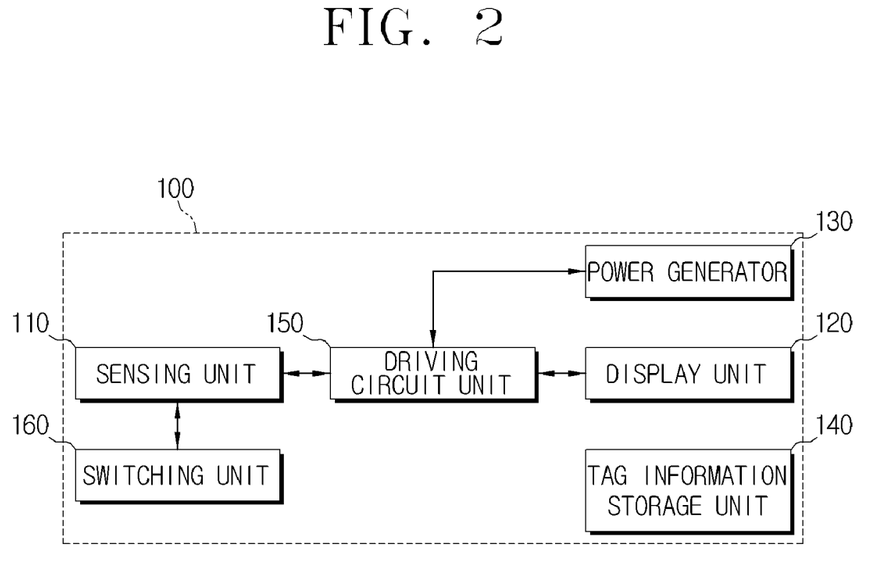
FIG. 2 is a detailed block diagram illustrating the display tag of FIG. 1.

FIG. 2 is a detailed block diagram illustrating the display tag of FIG. 1. Referring to FIG. 2, the display tag 100 may include a power generator 130, a tag information storage unit 140, a driving circuit unit 150, and a switching unit 160 in addition to the sensing unit 110 and the display unit 120 illustrated in FIG. 1.

The power generator 130 generates power using at least one of heat, vibrations, rays emitted from the external tag writer (not shown), and electromagnetic waves, and enables the sensing unit 110 and the display unit 120 to operate.

In detail, the sensing unit 110 captures an image, and concurrently the power generator 130 generates power required to drive the sensing unit 110 and the display unit 120 using rays emitted from the image displayed on the external tag writer (not shown). For example, the power generator 130 may convert light energy into electrical energy using an amorphous solar battery having a solar cell which is used with a small sized electronic calculator.

The power generator 130 may also generate electrical energy using backscattering which generates induced power on a related art passive tag. If electromagnetic waves such as radio waves are provided on the display tag 100 via an external antenna, the induced current flows through a coil (not shown) provided in the display tag 100. The induced current causes the display tag 100 to be driven, and the display tag 100 re-transmits the provided electromagnetic waves to an external device as reflected waves.

If vibration is generated on the display tag 100, for example if user shakes the display tag 100, the vibration causes the induced power to be generated. Specifically, a vibrator having a cantilever structure is provided in a coil for generating induced current. If the vibrator vibrates, the induced current flows through the coil, and the coil stores the induced current using a capacitor. Thus, electrical energy is generated. Elements such as piezoelectric ceramics may be vibrated so as to generate electrical energy.

If the display tag 100 is heated, for example if a user rubs the display tag 100, induced power may be generated using the generated heat. For example, if organic molecules are heated, the heat may be converted into electrical energy according to the difference in temperature between the two ends of a thermoelectric element among various thermoelectric elements which generate electrical energy. The power generator 130 includes solar cells, and thus may generate electrical energy using the heat derived from solar energy.

The tag information storage unit 140 may store tag information acquired from the external tag writer (not shown). The external tag writer (not shown) transmits tag information to the display tag 100 in electromagnetic wave form, such as radio waves, and the tag information storage unit 140 of the display tag 100 receives tag information from the external tag writer (not shown), and stores the tag information in the tag information storage unit 140. If the external tag writer (not shown) transmits tag information, the display tag 100 merely receives the tag information. Accordingly, the tag information storage unit 140 may not be connected to other components, as shown in FIG. 2. On the other hand, the tag information storage unit 140 is connected to the driving circuit unit 150, and thus tag information is displayed on the display unit 120.

The tag information may include various information indicating, for example a path to access a movie file, actors appearing in the movie, or the running time of the movie. That is, the tag information generally represents all of the information transmitted to a tag in a tag system having a tag reader and writer.

The driving circuit unit 150 controls each pixel of the display unit 120 to be driven according to a signal output from the plurality of sensors. The power generated by the power generator 130 may be input to the driving circuit unit 150 to drive each pixel of the display unit 120.

The switching unit 160 may control the on-off operation of the sensing unit 110 to be turned on or off. The display tag 100 according to an exemplary embodiment of the present invention may capture an external screen using the sensing unit 110. However, it is not necessary that the sensing unit 110 always captures a display screen. Specifically, when a user desires to capture an image from the external tag writer (not shown), the user controls the switching unit 160 to turn on the sensing unit 110, so that the sensing unit 110 captures a screen of the external display apparatus. The switching unit 160 may be a switch which is attached to the display tag 100, and which adjusts the sensing unit 110 between on and off states. The switching unit 160 operates similarly to a switch which is disposed on a rear surface of a floppy disc, and which controls the disc to be write-protected. Accordingly, the switching unit 160 controls whether to capture a screen of the external display apparatus.

Figure 3:
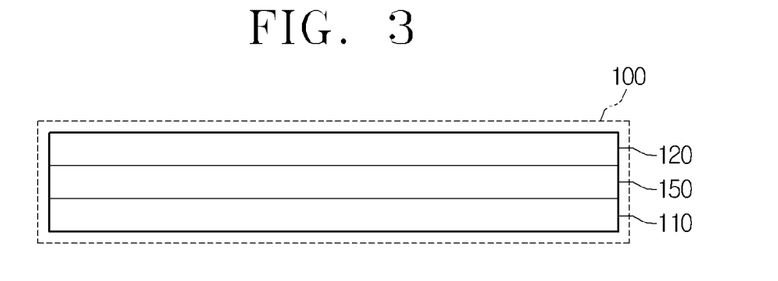
FIG. 3 is a view illustrating an arrangement of components of a display tag according to an exemplary embodiment of the present invention.

FIG. 3 is a view illustrating an arrangement of components of a display tag according to an exemplary embodiment of the present invention. Referring to FIG. 3, the display tag 100 according to an exemplary embodiment of the present invention includes the sensing unit 110, the driving circuit unit 150, and the display unit 120 which are disposed in successive layers thereon.

The sensing unit 110 may be provided as a layer having a plurality of sensors, the driving circuit unit 150 to control each pixel of the display unit 120 corresponding to the plurality of pixels to be driven may be provided as a layer, and the display unit 120 composed of E-paper may also be provided as a layer. The display tag 100 having the sensing unit 110, the driving circuit unit 150, and the display unit 120 which are disposed in successive layers may be fabricated using MicroElectroMechanical System (MEMS) processes, and thus the display tag 100 can be manufactured in large quantities at low cost.

The plurality of sensors provided on the sensing unit 110 may receive optical signals displayed on the screen of the external display apparatus (not shown). The display unit 120 includes a plurality of pixels corresponding one-to-one to the plurality of sensors receiving the optical signals, and the driving circuit unit 150 controls the plurality of pixels of the display unit 120 to be driven using the optical signals output from the plurality of sensors.

Figure 4:
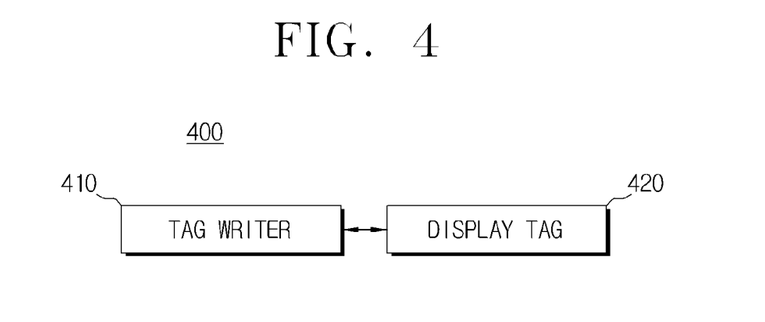
FIG. 4 is a block diagram illustrating a display tag system according to an exemplary embodiment of the present invention.

FIG. 4 is a block diagram illustrating a display tag system according to an exemplary embodiment of the present invention. Referring to FIG. 4, a display tag system 400 according to an exemplary embodiment of the present invention may include a tag writer 410 and a display tag 420.

The tag writer 410 displays an image corresponding to tag information to be provided. If the display tag 420 is disposed opposite a tag writing area on a screen of the tag writer 410, the display tag 420 captures an image displayed on the tag writing area.

If the display tag 420 is disposed opposite the tag writing area while an image is displayed on the tag writing area, the tag writer 410 may write tag information corresponding to the image on the display tag 420.

The tag writing area is disposed on the screen of the tag writer 410, and may be disposed opposite a sensing area of the display tag 420. The sensing area of the display tag 420 is preferably identical to the tag writing area in size, but the sensing area of the display tag 420 may be larger than the tag writing area of the tag writer 410.

The display tag 100 of FIG. 1 may be implemented using a general display apparatus rather than the display tag. According to an exemplary embodiment of the present invention, the display apparatus may include a display unit and a sensing unit.

If the sensing unit is disposed opposite a screen of an external display apparatus, the sensing unit captures an image displayed on an area corresponding to the display unit, and provides the display unit with the image. The display unit and the sensing unit of the display apparatus according to another exemplary embodiment of the present invention have functions similar to those of the display unit 120 and the sensing unit 110 of the display tag 100 illustrated in FIGS. 1 and 2. However, the display apparatus does not operate as a display tag to communicate with a display writer and reader, and operates as an independent display apparatus. In this case, the display unit displays an image corresponding to the image captured by the sensing unit, and may be implemented as E-paper, which displays an image even when the power is turned off. The display apparatus may be a mobile phone, a portable multimedia player (PMP), or an electronic dictionary. The display apparatus may also be fabricated as a card which may be connected to a mobile phone.

Figure 5:
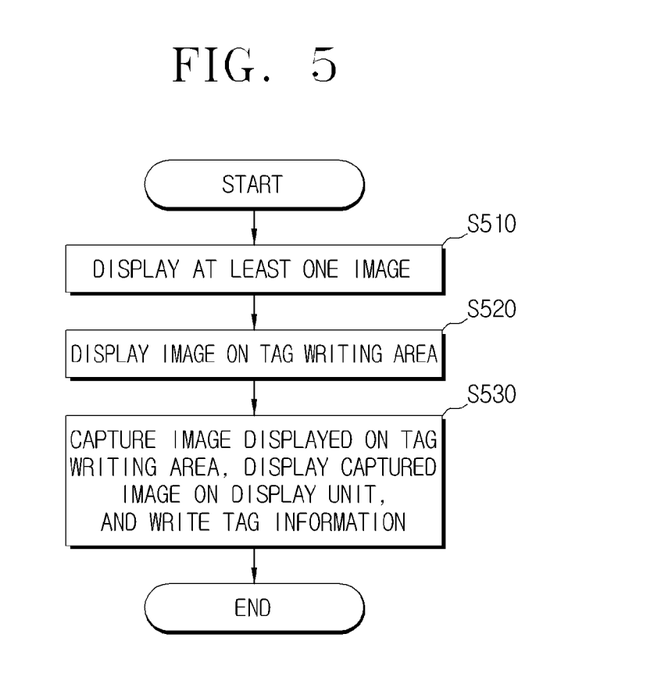
FIG. 5 is a flowchart illustrating a method for writing tag information of a display tag system according to an exemplary embodiment of the present invention.
Figure 6A:
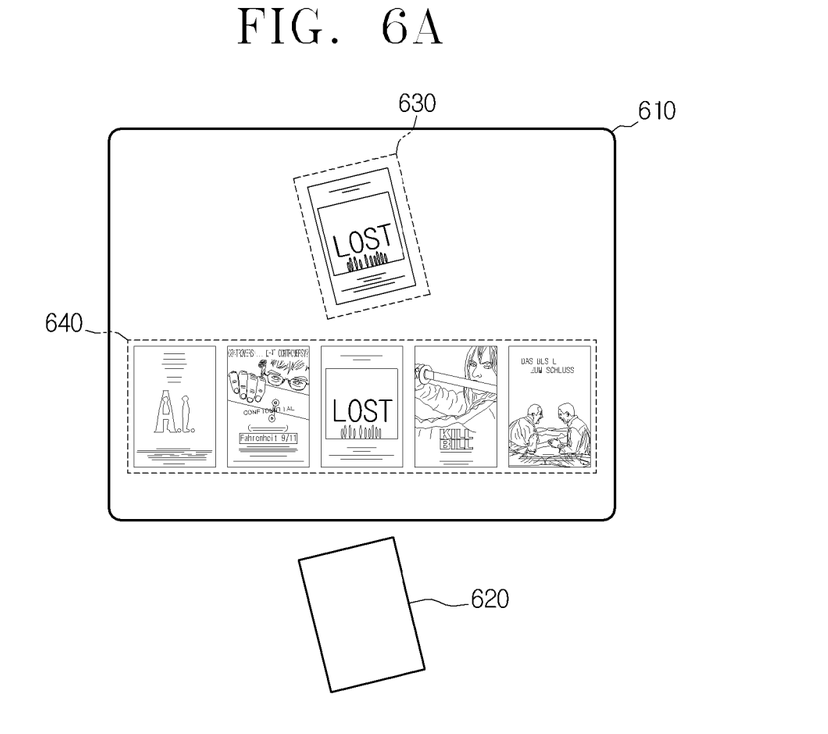
FIGS. 6A, 6B and 6C are views provided to explain the method of FIG. 5.
Figure 6B:
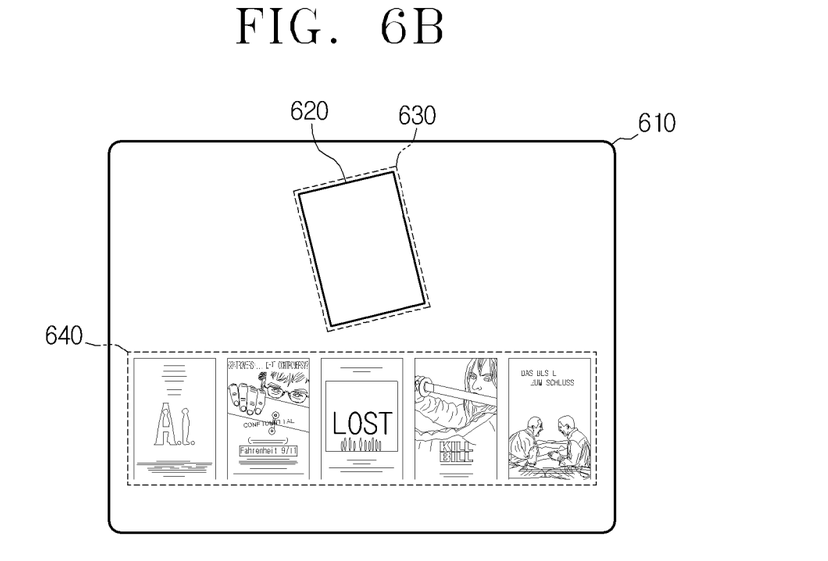

FIG. 5 is a flowchart illustrating a method for writing tag information of a display tag system according to an exemplary embodiment of the present invention, and FIGS. 6A and 6B are views provided to explain the method of FIG. 5.

Figure 6C:
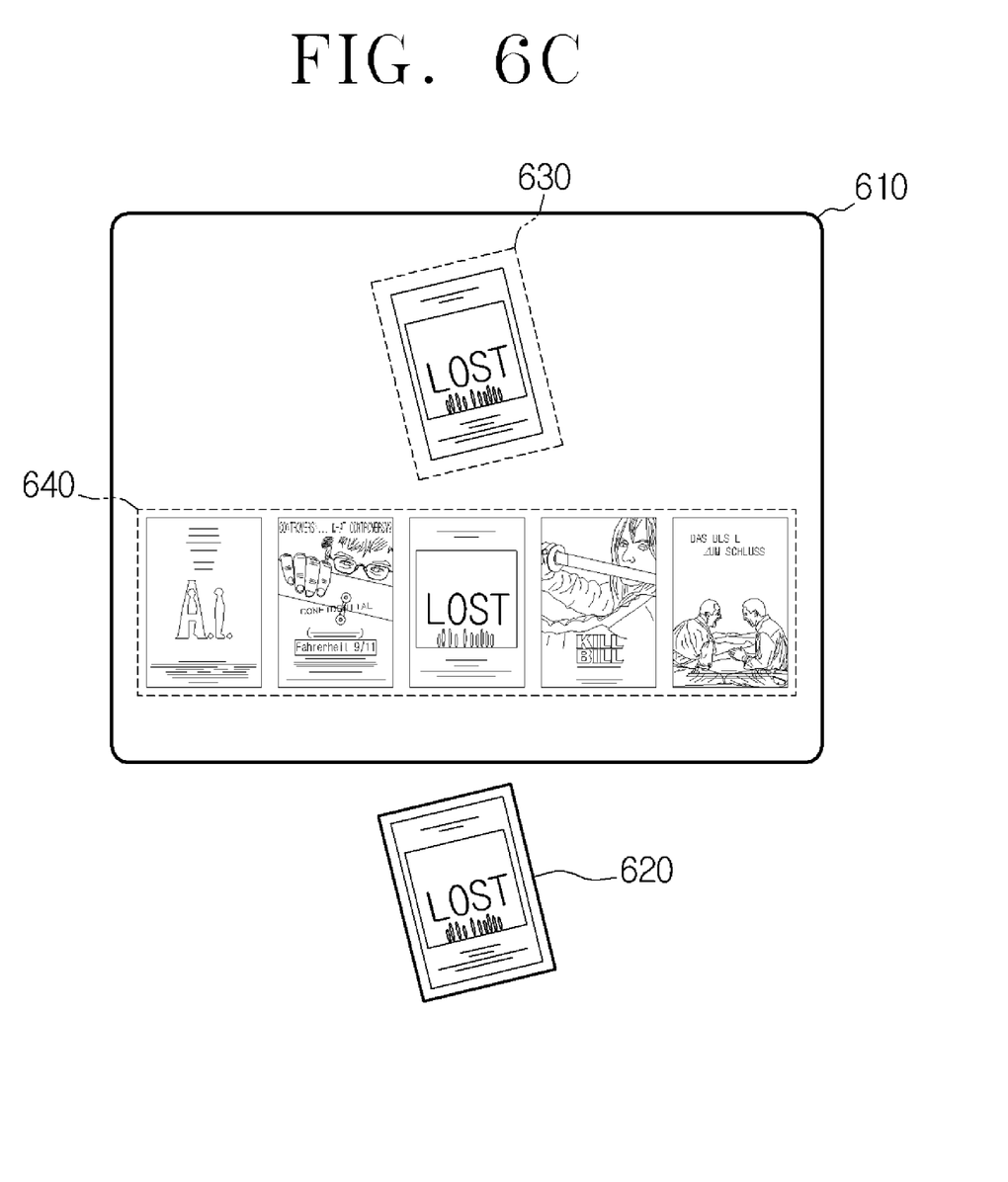

Referring to FIGS. 5 to 6C, a tag writer 610 displays an image corresponding to tag information to be provided (S510). Specifically, the tag writer 610 may display a plurality of movie poster images 640 as shown in FIG. 6A.

If at least one of the movie poster images 640 is selected, the tag writer 610 may display the selected image on a tag writing area of a screen (S520). Specifically, if a user selects a movie poster image "LOST" from the plurality of movie poster images 640, the selected movie poster image "LOST" is displayed on a tag writing area 630 of the tag writer 610.

If the display tag 620 having the display unit is disposed opposite the tag writing area 630, the display tag 620 captures an image displayed on the tag writing area 630, and displays the captured image on the display unit, and the tag writer 610 writes tag information corresponding to the selected image on the display tag 620 (S530).

If the display tag 620 is disposed opposite the tag writing area 630 of the tag writer 610 as shown in FIG. 6B, the display tag 620 captures an image displayed on the tag writing area 630, and displays the captured image on the display unit as shown in FIG. 6C. In this case, the tag writer 610 may write the tag information corresponding to the selected image on the display tag 620.

Figure 7A:
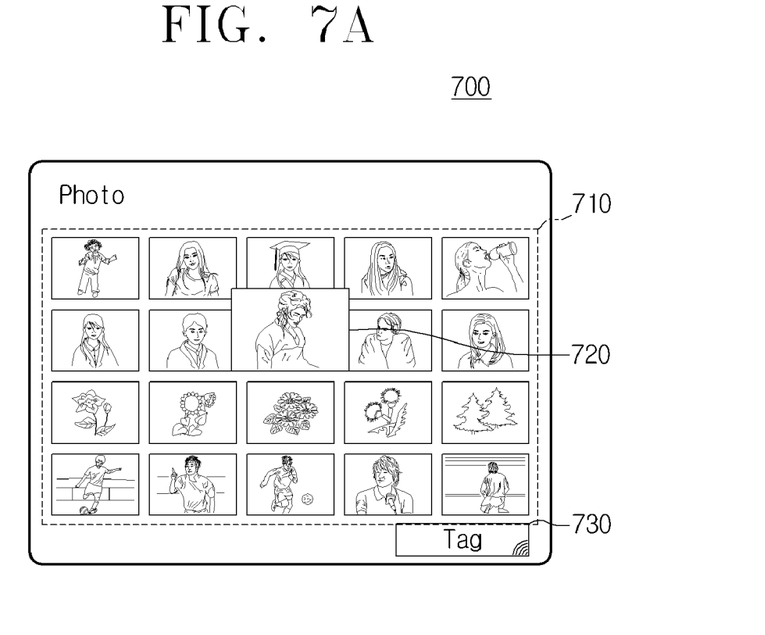
FIGS. 7A and 7B are views provided to explain the method of FIG. 5.
Figure 7B:
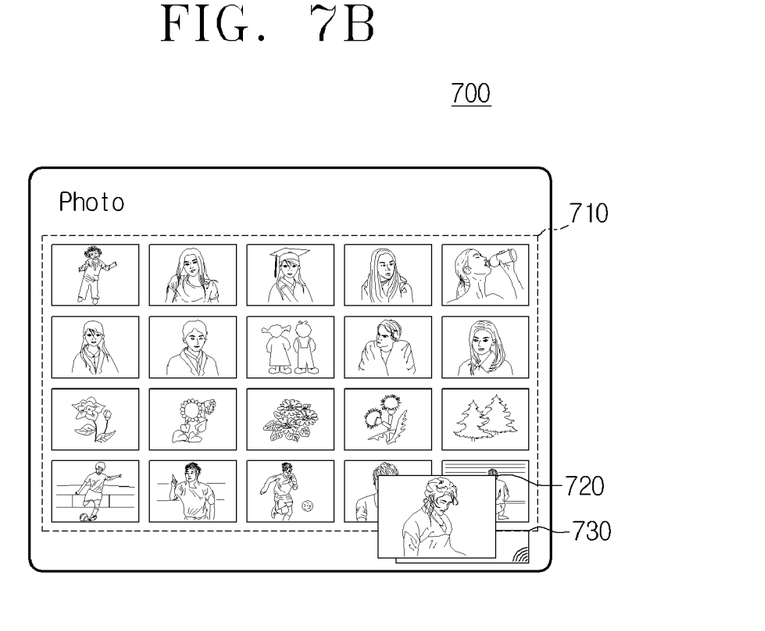

FIGS. 7A and 7B are views provided to explain the method of FIG. 5. FIGS. 7A and 7B illustrate another exemplary embodiment of operations S510 and S520 explained in FIG. 5.

A tag writer 700 of FIG. 7A may display a plurality of display images 710, and a user may select a certain image 720 from the plurality of display images 710. A user drags the selected image 720, and drops the image 720 onto a tag writing area 730 using a mouse. The user may capture an image by disposing a display tag opposite the selected image 720 moved onto the tag writing area 730.

According to exemplary embodiments of the present invention, a display tag is provided to capture an image from an external source, and to display the captured image, so a user can view information regarding a tag. Therefore, user convenience is enhanced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display tag comprising:
    a sensing unit which captures an image displayed on a screen of an external tag writer, if the sensing unit is disposed opposite to the screen, wherein the sensing unit comprises a plurality of sensors which constitute a sensing area, and receives light rays of the image displayed on the screen of the external tag writer and outputs a signal corresponding to intensities of the light rays; and
    a display unit which receives the signal from the sensing unit and displays the captured image, wherein the display unit comprises a plurality of pixels corresponding one-to-one to the plurality of sensors.

2. The display tag of claim 1, wherein the display tag comprises electronic paper (E-paper).

3. The display tag of claim 1, further comprising:
    a switching unit which controls an on-off operation of the sensing unit.

4. The display tag of claim 1, further comprising:
    a power generator which generates power using at least one of heat, vibration, light rays emitted from the external tag writer, and electromagnetic waves, and supplies power to the sensing unit and the display unit.

5. The display tag of claim 1, further comprising:
    a tag information storage unit which stores tag information acquired from the external tag writer.

6. The display tag of claim 1, wherein a size of the sensing area and a size of the display unit are substantially the same.

7. The display tag of claim 1, further comprising:
    a driving circuit unit which controls each of pixels of the display unit to be driven according to a signal output from the plurality of sensors,
    wherein the sensing unit, the driving circuit unit, and the display unit are disposed in successive layers.

8. A display tag system comprising:
    a tag writer which displays an image corresponding to tag information on a tag writing area; and
    a display tag which captures the image displayed on the tag writing area, if a sensing unit of the display tag is disposed opposite to the tag writing area, wherein the display tag comprises:
    the sensing unit which captures the image displayed on the tag writing area, wherein the sensing unit comprises a plurality of sensors which constitute a sensing area, and receives light rays of the image displayed on the screen of the external tag writer and outputs a signal corresponding to intensities of the light rays; and
    a display unit which receives the signal from the sensing unit and displays the captured image, wherein the display unit comprises a plurality of pixels corresponding one-to-one to the plurality of sensors.

9. The display tag system of claim 8, wherein if the display tag is disposed opposite to the tag writing area while the image is displayed on the tag writing area, the tag writer writes tag information corresponding to the image on the display tag.

10. A display apparatus comprising:
    a display unit which comprises a plurality of pixels; and
    a sensing unit which comprises a plurality of sensors which constitute a sensing area, and the plurality of sensors capture an image displayed on a screen of an external display apparatus by receiving light rays of the image displayed on the screen of the external display apparatus and outputs a signal corresponding to the light rays, and provide the display unit with the captured image, if the sensing unit is disposed opposite to the screen.

11. The display apparatus of claim 10, wherein the display unit comprises:
    electronic paper (E-paper) which displays an image corresponding to the captured image, and maintains the same display condition even if the power is turned off.

12. A method for writing tag information of a display tag system, the method comprising:
    displaying at least one image corresponding to tag information which is capable of being provided by a tag writer;
    if one of the at least one image is selected as a selected image, displaying the selected image on a tag writing area on a screen of the tag writer; and
    if a display tag having a display unit is disposed opposite the tag writing area, receiving at least one of heat, vibration, light rays, and electromagnetic waves emitted from the external tag writer to generate power, automatically capturing, by the display tag, the selected image displayed on the tag writing area using the generated power, and displaying the captured image on the display unit, and writing, by the tag writer, tag information corresponding to the selected image on the display tag.

13. A display tag comprising:
    a sensing unit which automatically captures an image emitted by an external tag writer, if the sensing unit is disposed adjacent to a screen of the external tag writer;
    a display unit which displays the captured image; and
    a power generator which generates power using at least one of heat, vibration, light rays emitted from the external tag writer, and electromagnetic waves, and supplies power to the sensing unit and the display unit,
    wherein the power generator supplies the power to the sensing unit and the sensing unit operates based on the supplied power to automatically capture the image,
    wherein the sensing unit comprises a plurality of sensors which constitute a sensing area, and
    wherein the display unit comprises a plurality of pixels corresponding one-to-one to the plurality of sensors.

14. The display unit of claim 13, wherein the sensing unit does not automatically capture the image if the sensing unit is not disposed adjacent to the screen.

15. A method for writing tag information of a display tag system, the method comprising:
    displaying a plurality of images corresponding to tag information stored in an external tag writer;
    if one of the plurality of images is selected as a selected image, displaying the selected image on a first area of a screen of the external tag writer;
    if a display tag having a display unit is adjacent to the first area, receiving at least one of heat, vibration, light rays, and electromagnetic waves emitted from the external tag writer to generate power, automatically capturing, by the display tag, the selected image displayed on the first area using the generated power, and displaying the captured image on the display unit.

16. The method of claim 15, wherein if the display tag is not adjacent to the first area, the power is not generated and automatically capturing does not occur.

17. The display tag of claim 1, wherein the image is displayed on a first area of the screen of the external tag writer, and, if the sensing unit is adjacent to the first area of the screen, the sensing unit automatically captures the image displayed on the first area of the screen.

18. The display tag of claim 17, wherein, upon disposing the sensing unit adjacent to the first area of the screen, the sensing area completely covers the first area of the screen and the sensing unit captures an entire image displayed on the screen of the external tag writer simultaneously.

19. The display unit of claim 13, wherein, if the sensing unit is disposed adjacent to the screen, the power generator receives at least one of the heat, the vibration, the light rays, and the electromagnetic waves emitted from the external tag writer to generate power, and the sensing unit automatically captures the image displayed on the screen using the generated power, and the display unit displays the captured image.

20. The display unit of claim 13, wherein the sensing unit receives light rays of the image displayed on the screen of the external tag writer and outputs a signal corresponding to intensities of the light rays; and the display unit receives the signal from the sensing unit and displays the captured image.

* * * * *